United States Patent [19]
Hoshino

[11] Patent Number: 5,983,241
[45] Date of Patent: Nov. 9, 1999

[54] FILE MANAGEMENT SYSTEM AND FILE MANAGEMENT METHOD

[75] Inventor: Haruhisa Hoshino, Kanagawa, Japan

[73] Assignee: Fuji Xerox Co., Ltd., Tokyo, Japan

[21] Appl. No.: 08/682,969

[22] Filed: Jul. 18, 1996

[30] Foreign Application Priority Data

Jul. 19, 1995 [JP] Japan .................................. 7-182545

[51] Int. Cl.⁶ .................................................. G06F 17/30
[52] U.S. Cl. .......................................... 707/203; 707/200
[58] Field of Search ..................................... 707/200, 203

[56] References Cited

U.S. PATENT DOCUMENTS

| | | | |
|---|---|---|---|
| 5,499,365 | 3/1996 | Anderson et al. | 707/203 |
| 5,535,386 | 7/1996 | Wang | 707/203 |
| 5,603,027 | 2/1997 | Ohkami | 707/203 |
| 5,664,177 | 9/1997 | Lowry | 707/100 |
| 5,835,911 | 11/1998 | Nakagawa et al. | 707/203 |

FOREIGN PATENT DOCUMENTS 6-103484   12/1994   Japan .

*Primary Examiner*—Paul V. Kulik
*Assistant Examiner*—Greta Robinson
*Attorney, Agent, or Firm*—Finnegan, Henderson, Farabow, Garrett & Dunner, L.L.P.

[57] ABSTRACT

A file management system includes a file link control section for relating earlier and later version files to files and a version group information getting section for getting a version group consisting of files having specific relationship with a specified file based on relation information. The file link control section relates the files to each other only with the file identifiers of the earlier and later version files and enables highly flexible registration and deletion in version relationships, and linking and separating of version groups associated with the registration or deletion. The version group information getting section traces the relation information for getting file information.

8 Claims, 13 Drawing Sheets

FILE MANAGEMENT SYSTEM AND FILE MANAGEMENT METHOD

BACKGROUND OF THE INVENTION

This invention relates to a file management method for executing file management of file versions, etc., and a file management system to which the method is applied.

On a network, each server manages files existing at positions that can be managed by the server itself with file identifiers. The files under the management of the server are shared by a plurality of clients. Therefore, a plurality of files different in contents may be created from one file, in which case parentage among the files, namely, version relationship is produced and the files having some bearing on each other make up a version group.

FIG. 24 is a schematic block diagram of a client-server system.

According to the system block diagram, the client-server system comprises clients 1, 2, and 3 and servers 4 and 5 which can be workstations or personal computers; they have each a communication function and are connected to each other by a local area network 6. Further, another network system 7, a mainframe computer 8, etc., may be connected to the local area network 6 via a communication link.

Such a system containing a plurality of client machines and a plurality of server machines can provide a distributed filing system or a distributed data processing system, and the servers 4 and 5 can distribute and save documents or data created by the clients 1, 2, and 3 to and in a plurality of servers. Further, the clients 1, 2, and 3 can fetch the saved documents or data, edit/update the documents or data, and register/save the resultant documents or data as different documents or data.

FIG. 25 is a block diagram to show a configuration example of a server.

A server 9 shown in the figure has a communication section 9a connected to the local area network 6, a file storage section 9b for storing document files or data files, and a file processing section 9c for performing input/output management of document files or data files, and provides a file server to enable one client in the client-server system to access and use document files, etc., created by another client.

When receiving a request for registering or editing a document file from a client through the communication section 9a, the file processing section 9c registers or fetches the document file in or from the file storage section 9b.

When the contents of a document file are updated, a new updated document file is created from the original document file existing before the update. In such file update, there is only one earlier version (before update) file of one updated document file; in the version management method, the version relationship between the document files before and after update are constructed like a linear or tree structure and version management is easy.

When the contents of a document file are updated, the relationship between the document files, namely, version information may be recorded so that the document file based on which the document file contents are updated can be seen. For example, a system described in Japanese Patent Publication No. Hei 6-103484 is available as a system for recording the version information for managing a number of document files. According to Japanese Patent Publication No. Hei 6-103484, a version relationship holding system is described wherein a version root identifier is assigned to an original file and can be used to hold a plurality of the earlier version documents. That is, the system has version management means having a plurality of earlier version files, assigns a version root identifier to the original file from which the later version files are derived, and uses the identifier to relate the later version files derived to each other, thereby managing the files derived from the same original file as a single group.

However, in the version management method having only one earlier version file, when a version management method having a plurality of earlier version (before update) files, for example, resulting from combining two files to create a new file is considered, the version relationship does not become a simple linear or tree structure; if a file is deleted, relationship management of version relationship update, etc., becomes complicated.

On the other hand, in the system described in Japanese Patent Publication No. Hei 6-103484, when a new file is registered in a version information file, a plurality of files in the same version group can be set as earlier versions, but a plurality of files in different version groups cannot be set as earlier versions, namely, a plurality of files cannot be combined to create an update file. Further, the system can hold complicated version relationship, but enables only getting earlier and later version files and getting files using version root identifiers; file handling based on the version relationship, for example, such file handling of tracing the version relationship and getting only necessary files is difficult to perform.

SUMMARY OF THE INVENTION

It is therefore an object of the invention to provide a file management system and a file management method for performing highly flexible registration and deletion in version relationships, linking and separating of version groups associated with the registration or deletion, and getting of necessary files from version relationships in version management of files having earlier and later versions.

To the end, according to one aspect of the invention, there is provided a file management system for managing files stored in a file storage, comprising file link control means for giving file identifiers of earlier and later version files of the files to the files as file version attributes, and file information getting means being responsive to a request for getting a version group having specific version relationship with a specified file for tracing the version attributes of the specified file and getting information of files belonging to the version group.

In the file management system of the invention, the file link control means has version relationship link means, when a file is registered or changed, for adding file identifiers of earlier or later version files to the file and files having version relationship with the file for linking the files and version relationship separation means, when a file or the version attribute of a file is deleted, for deleting the version attributes of files having version relationship with the file.

The file link control means further includes version relationship mismatch determination means, when version relationship among files is set or added, for determining whether or not a version relationship loop is made by setting or adding the version relationship among files.

The file link control means further includes version relationship relinking means, when version relationship among files is deleted, for relinking version relationships for other files having direct version relationship with the deleted file so that the version relationships are continued.

According to another aspect of the invention, there is provided a file management method for managing files stored in a file storage, comprising the steps of giving file identifiers of earlier and later version files of the files to the files as the version attributes of the files, thereby assigning version relationships among files to the files, and when getting files in a version group having specific version relationship with a specified file, tracing the file identifiers of the earlier or later version files from the version attribute of the specified file with the specified file as a start point and collecting files having the specific version relationship with the specified file.

According to the file management system having the means described above, the file link control means gives the file identifiers of earlier and later version files to a specified file and files to construct version relationship with the specified file as version attributes of the files in response to earlier or later version relationship. Upon reception of a request for getting files with specification of one file and version relationship, the file information getting means traces the version attributes of the specified file in order starting at the specified file, thereby getting information of files belonging to version group and having specific version relationship from among files among which version relationships are constructed by the file link control means. Thus, also for files updated in a complicated process, information of files having various version relationships can be gotten from information saved according to version attributes containing the complicated process.

The file link control means can be made up of the version relationship link means and the version relationship separation means for giving and deleting the file identifiers of earlier and later version files to and from the files stored in the file storage, whereby new version relationships among files can also be assigned to already existing files and the version relationship among files having version relationship can also be separated.

When an attempt is made to set or add version relationship in or to already existing files, the version relationship mismatch determination means of the file link control means determines whether or not a version relationship loop, namely, such a version relationship loop where as version relationships are traced, a return is made to already traced version relationship is made if that version relationship is set or added. When the version relationship mismatch determination means determines that a version relationship loop is made, the version relationship is not set or added for preventing a version relationship mismatch from occurring.

When an attempt is made to delete a file in the same version group liked so far by version relationship, the version relationship relinking means of the file link control means relinks version relationships for other files having direct version relationship with the deleted file so that deletion of the file does not cause the version relationships among the earlier and later version files of the deleted file to be cut.

Further, information held by the file management system for version management is only earlier and later versions and is small as a data amount, thus version management costs can be reduced.

According to the file management method described above, first the file identifiers of earlier and later version files are given to the files stored in the file storage as the version attributes of the files, thereby holding version relationships among files. To get information of files having specific version relationship, a file is specified and version relationship with the specified file is specified, whereby the file identifiers of the earlier or later version files are traced from the version attribute of the specified file with the specified file as a start point and the files having the specific version relationship with the specified file are collected. Meanwhile, the files having the specific version relationship with the specified file are checked and the corresponding files are picked up, whereby information of files having every version relationship can be gotten if the files are in the same version group. For example, the file identifiers of the earlier or later version files of a specified file are traced one at a time and all files found during the tracing are collected, whereby if the file identifiers of the earlier version files are traced, the files of all ancestors of the specified file can be gotten or if the file identifiers of the later version files are traced, the files of all descendants of the specified file can be gotten. If the number of times tracing is performed is specified, the files having specific generation relationship with a specified file can be gotten. The last traced file becomes the oldest or most recent version file from the specified file. Further, the files having different file relationship can be gotten by combining the tracing methods in such a manner that the files having specified version relationship with a specified file are collected and then the files having different version relationship with the collected files as specified files are collected. For example, the file identifiers of the earlier version file of a specified file are examined and the parent version files of the specified file are gotten, then the file identifiers of the later version files of the parent version files are examined and the child version files of the parent files are gotten, whereby the brother version files of the specified file if they are viewed from the specified file can be gotten.

DETAILED DESCRIPTION OF THE INVENTION

Referring now to the accompanying drawings, there is shown one preferred embodiment of the invention.

Figure 1:
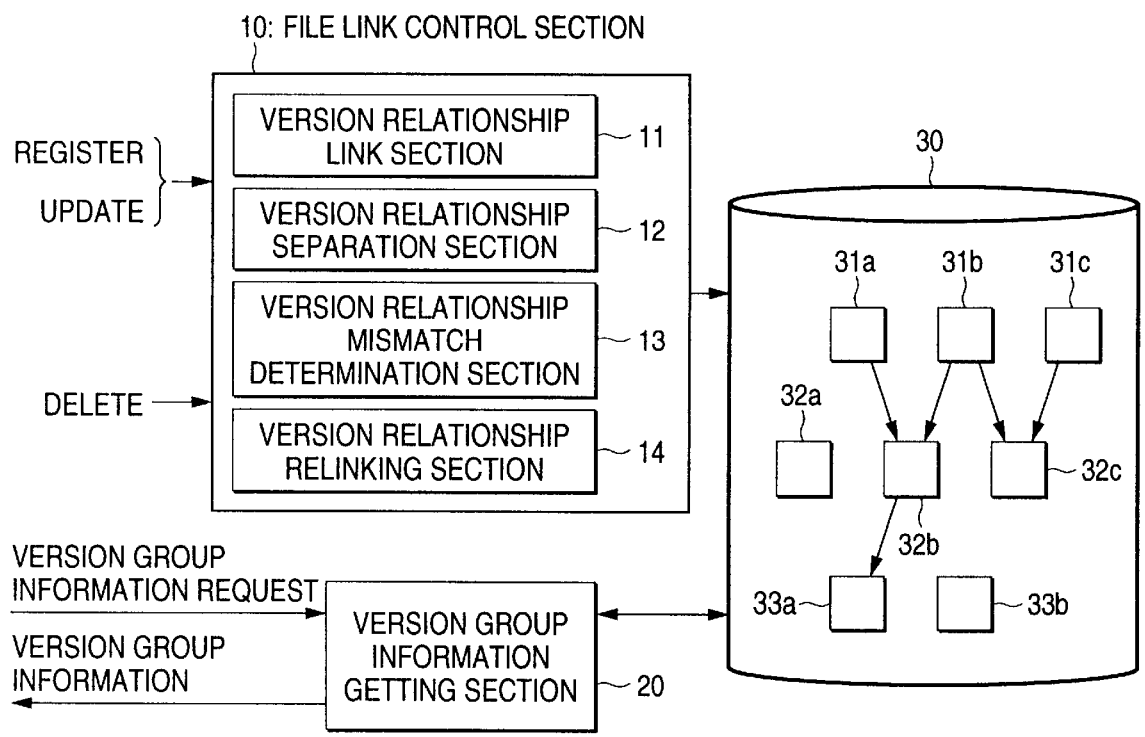
FIG. 1 is a block diagram to show the configuration of a file management system according to one embodiment of the invention.

FIG. 1 is a block diagram to show the configuration of a file management system according to the embodiment of the invention.

The file management system comprises a file link control section 10 for relating earlier and later version files to one file and a version group information getting section 20 for getting a version group consisting of files having specific relationship with a specified file based on relation information. These file link control section 10 and the version group information getting section 20 are connected to a version information storage section 30 for storing relation information among files.

The file link control section 10 has a version relationship link section 11 for relating a file to files having version relationship with the file when the file is registered or updated and a version relationship separation section 12 for separating version relationship when file deletion or version relationship deletion among files is executed.

The file link control section 10 also has a version relationship mismatch determination section 13 for determining whether or not a version relationship loop is made by setting or adding version relationship when an attempt is made to set or add version relationship among files and a version relationship relinking section 14 for relinking version relationship cut by deletion when a file in the same version group or version relationship among files therein is deleted.

The version relationship loop means such a version relationship loop wherein when the version relationships are traced, a return is made to the already traced version. To avoid this loop, the version relationship mismatch determination section 13 checks before the version relationship link section 11 actually sets or adds version relationship.

If an attempt is made to delete the version relationship of one file by the version relationship separation section 12, the earlier and later version relationships are interrupted by the file and the version group may be decomposed or divided. Thus, to prevent the earlier and later version relationships from being interrupted when a file is deleted or only the version relationship among files is deleted, the version relationship is relinked by the version relationship relinking section 14.

The version information storage section 30 stores version information representing new version relationship among files constructed when a new file is registered based on a number of files, when an already existing file is updated, or when a file or relation information is deleted, for example. In the example shown in FIG. 1, the version information is denoted by square boxes and comprises file identifier information 31a, 31b, 31c, 32a, 32b, 32c, 33a, and 33b and version attribute information representing version relationships as arrows. In FIG. 1, the file corresponding to the file identifier information 32b is created from the two files corresponding to the file identifier information 31a and 31b and further is updated to create the file corresponding to the file identifier information 33a, and the file corresponding to the file identifier information 32c is created from the two files corresponding to the file identifier information 31b and 31c. The version information stored in the version information storage section 30 is stored in a version information file provided aside from the files and is managed, for example.

Figure 2:
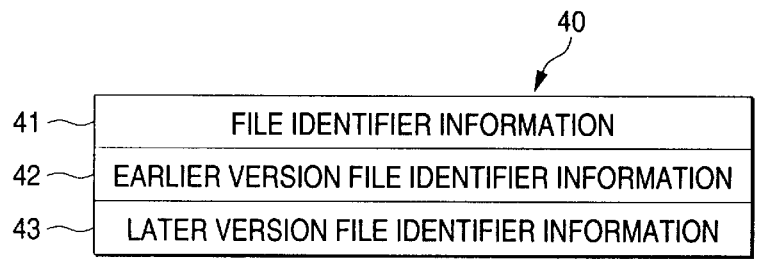
FIG. 2 is an illustration to show a data structure example of version information.

FIG. 2 is an illustration to show a data structure example of the version information.

Version information 40 is made up of file identifier information 41 for identifying the file, earlier version file identifier information 42 for identifying the earlier version files, and later version file identifier information 43 for identifying the later version files. The file identifier information shown in FIG. 1 corresponds to the file identifier information 41 and the version attribute information corresponds to the earlier version file identifier information 42 and later version file identifier information 43. If a plurality of files are related, the earlier version file identifier information 42 or later version file identifier information 43 has a plurality of file identifiers.

Here, a specific example of file version management using the version information will be discussed.

Figure 3:
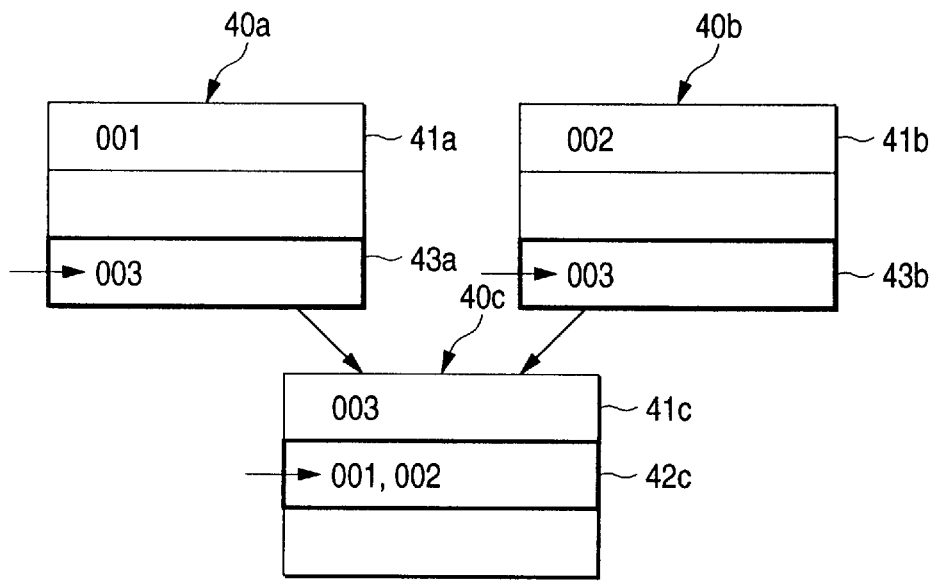
FIG. 3 is an illustration to show an example of version information to register a file having two files as earlier version files.

FIG. 3 is an illustration to show an example of version information to register a file having two files as earlier version files.

As shown in the figure, version information pieces 40a and 40b of the two files as the earlier version files have file identifiers 001 and 002 in the file identifier information 41a and 41b, and version information 40c of the file created from the two files has file identifier 003 in the file identifier information 41c. The file identifiers of the earlier version files, 001 and 002, are set in the earlier version file identifier information 42c of the version information 40c of the new registered file, and the file identifier 003 is set in the later version file identifier information 43a and 43b of the version information 40a and 40b accordingly, whereby it is seen that, for example, the file having the version information 40a contains the file having the file identifier 003 created (version up) based on that file by seeing the version attribute.

Figure 4:
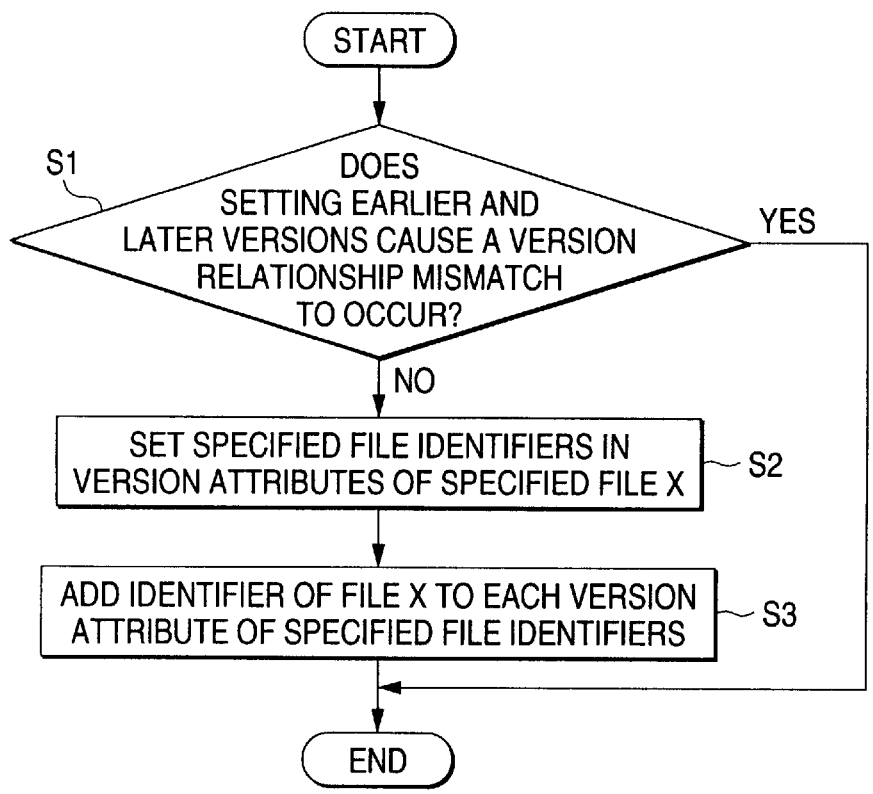
FIG. 4 is a flowchart to show a flow of an addition setting process of earlier and later versions.

FIG. 4 is a flowchart to show a flow of an addition setting process of earlier and later versions.

When one file is created or an already existing file is specified and an addition setting process of the earlier and later versions is executed, the earlier and later versions are set in the version information corresponding to the file and the files having the version relationship with the file.

First, to set the earlier and later versions, namely, set the identifiers of specified files in the earlier version file identifier information and later version file identifier information of the version information of specified file X, whether or not a version relationship mismatch, namely, a loop is made is determined at step S1. Unless the loop is made, the earlier and later versions can be set regardless of what version relationship the file already has. If a loop is made, the earlier and later versions cannot be set. Therefore, if a version relationship mismatch is determined to occur at step S1, the addition setting process of the earlier and later versions is not executed and is terminated.

If no version relationship mismatch is determined to occur, the identifiers of files specified so as to have the version relationship with the specified file X are set in or added to the earlier version file identifier information and later version file identifier information (version attributes) of the version information of the specified file X at step S2, and the file identifier of the specified file X is added to the version attribute in each version information piece of the identifiers of the files specified at step S3.

Figure 5:
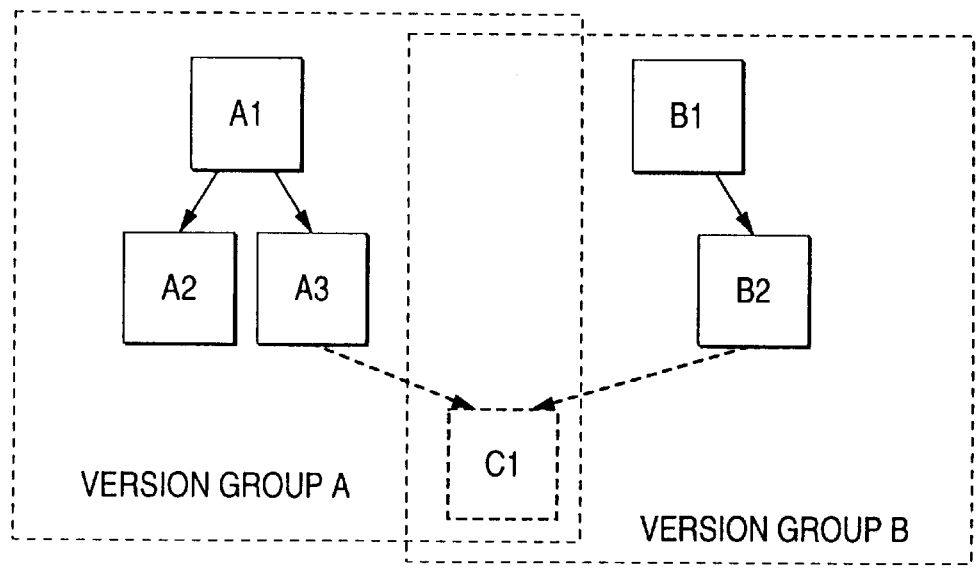
FIG. 5 is an illustration to show version group relationship when version information is set for constructing version relationship.

FIG. 5 is an illustration to show version group relationship when version information is set for constructing version relationship.

A file group having the same version relationship concatenation, namely, the same version root is a version group. In FIG. 5, the file group consisting of files A1, A2, and A3 forms version group A and the file group consisting of files B1 and B2 forms version group B. Although the version groups A and B are separate version groups, for example, file C1 resulting from combining the files A3 and B2 and updated can also be registered in the file management system. If the new file C1 having the files in different version groups as earlier version files is registered, it can be managed with the files A3 and B2 as the earlier version files. From the file C1, it can be assumed that all files in the version group A, all files in the version group B, and the file C1 belong to the same version group (group A+B), thus the version groups different so far can also be combined by linking the version relationships. Resultantly, from the file C1, the version relationship between the version groups can be managed.

The conventional file management systems do not allow such version management wherein a file has files belonging to different version groups as the earlier version files, but if files updated (version up) in different processes are combined to create a new file, their version relationship can also be managed in the embodiment.

Figure 6:
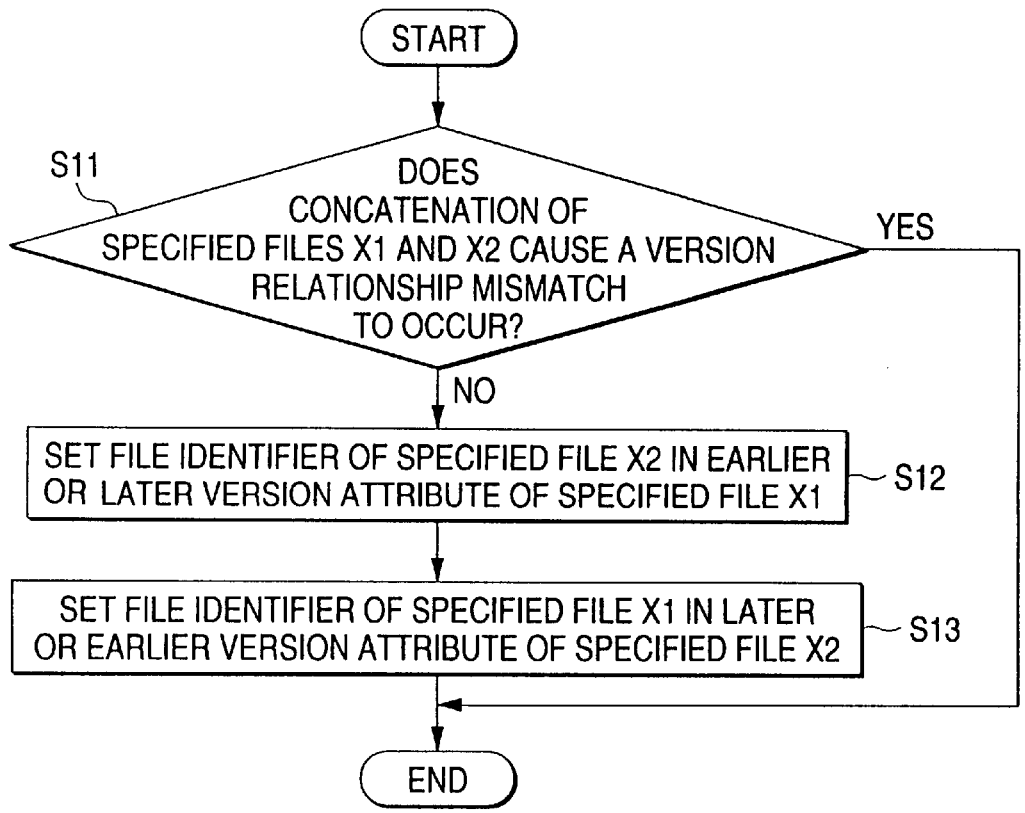
FIG. 6 is a flowchart to show a flow of a file combining process.

FIG. 6 is a flowchart to show a flow of a file combining process.

To set version relationship in two files, first whether or not a version relationship mismatch, namely, a loop is made if the two specified files X1 and X2 are combined is determined at step S11. If a version relationship mismatch is determined to occur, version relation is not set in the two files and the process is terminated.

If no version relationship mismatch is determined to occur, the file identifier of the specified file X2 is added to the earlier version file identifier information or later version file identifier information (earlier or later version attribute) of the version information of the specified file X1 at step S12, and the file identifier of the specified file X1 is added to the later version file identifier information or earlier version file identifier information (later or earlier version attribute) of the version information of the specified file X2 at step S13.

Thus, the version relationship is set for the existing files; if the specified files belong to different version groups, the version groups are concatenated to create a new version group.

Figure 7:
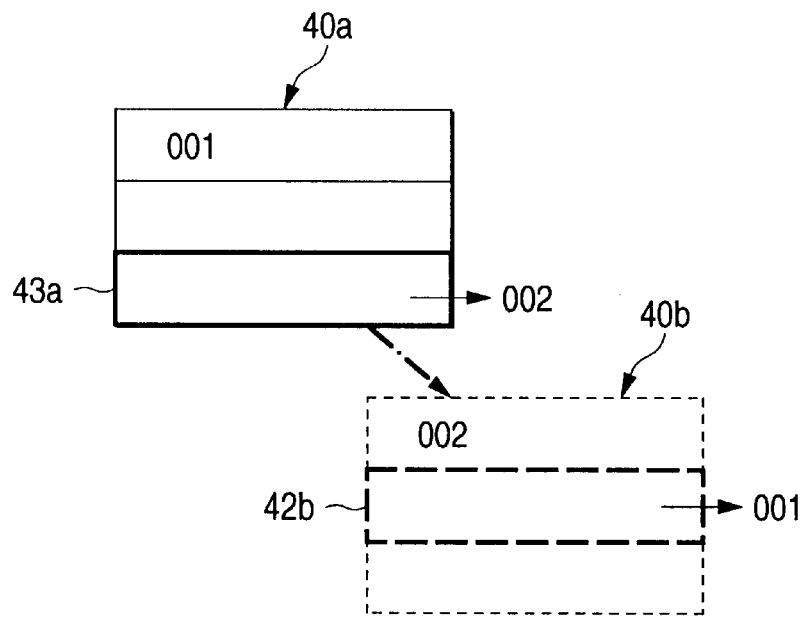
FIG. 7 is an illustration to show an example of version information to delete a file.

FIG. 7 is an illustration to show an example of version information to delete a file.

As shown in the figure, two files have file identifiers 001 and 002 and has version relationship with each other, and deletion of the file having the file identifier 002 or canceling of the version relationship of the file having the file identifier 002 with another file, in the example, the file having the file identifier 001 will be discussed.

First, the file identifiers 001 and 002 are contained in file identifier information 41a and 41b of version information 40a and 40b and the identifier of the file having the version relationship, 002, is set in later version file identifier information 43a of the version information 40a and the identifier of the file having the version relationship, 001, is set in earlier version file identifier information 42b of the version information 40b. Here, if the file with the file identifier 002 or the version attribute is deleted, the file identifier information 002 set in the later version file identifier information 43a of the version information 40a of the file as the earlier version file is deleted.

When the version attribute is deleted, the file may contain earlier and later version files. In such a case, a method of deleting the version attribute while holding the earlier and later version relationships is also available in addition to the method of deleting the version attribute in the form of completely separating the version relationship as in the version information 40a in the example in FIG. 7. That is, the files related via the deleted version information is directly related to each other and the version relationship is relinked. Separation or relinking of the version relationship can be selected when the version attribute or the file is deleted.

Figure 8:
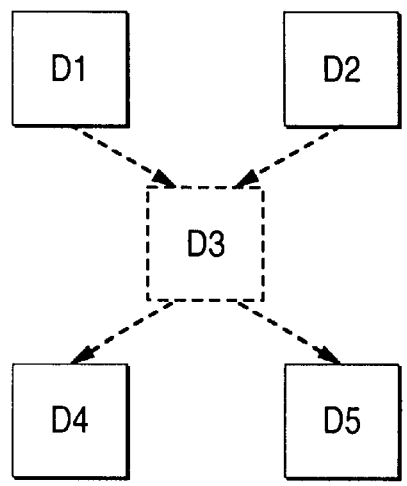
FIGS. 8(A) and 8(B) are illustrations to show integrity holding of version relationship when version information or a file is deleted.
Figure 8:
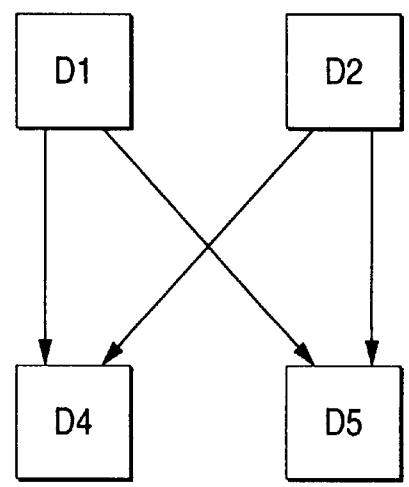

FIGS. 8(A) and 8(B) are illustrations to show integrity holding of the version relationship when version information or a file is deleted.

When one file belonging to the same version group or version information of one file is deleted, the earlier and later version files of the file may have version relationship with each other. If file D3 or version information concerning the file D3 is deleted in version group D consisting of files D1–D5 as in FIG. 8(A), the files D1, D2, D4, and D5 having the earlier and later version relationships with the file D3 have their version relationships cut and are decomposed. Thus, as shown in FIG. 8(B), the version relationships are relinked so that the earlier and later version relationships are not cut, whereby integrity can be held if a plurality of earlier versions and a plurality of later versions exist.

Figure 9:
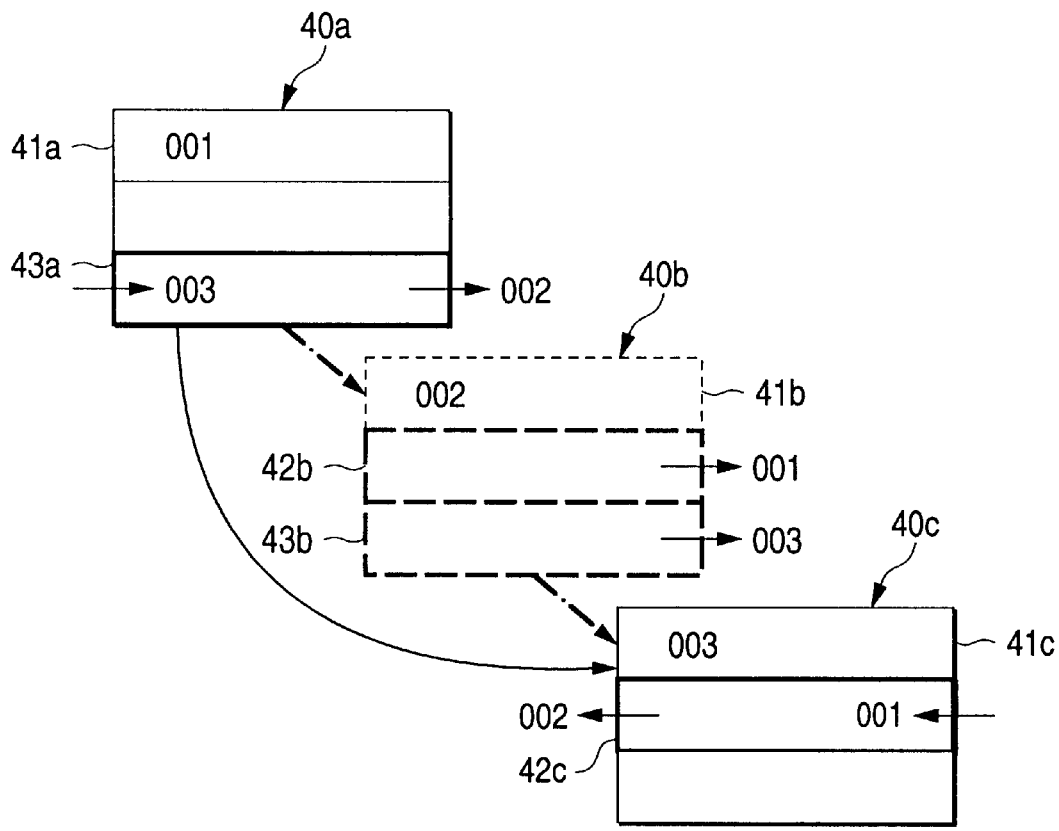
FIG. 9 is an illustration to show an example of version information to delete a file while holding earlier and later version relationships.

FIG. 9 is an illustration to show an example of version information to delete a file while holding earlier and later version relationships.

As shown in the figure, first, the file identifiers 001, 002, and 003 are contained in file identifier information 41a, 41b, and 41c of version information 40a, 40b, and 40c and the identifier of the file having the version relationship, 002, is set in later version file identifier information 43a of the version information 40a, the file identifier 001 is set in earlier version file identifier information 42b of the version information 40*b*, the file identifier 003 is set in later version file identifier information 43*b*, and the file identifier 002 is set in earlier version file identifier information 42*c* of the version information 40*c*.

Here, if the file corresponding to the version information 40*b* or the version attribute of the version information 40*b* is deleted, the earlier and later version relationships are relinked for holding the earlier and later version relationships. That is, the later version file identifier information 43*a* in the version information 40*a* of the earlier version of the version information 40*b* is changed from file identifier 002 to 003 and the earlier version file identifier information 42*c* in the version information 40*c* of the later version of the version information 40*b* is changed from file identifier 002 to 001 for relinking the version relationships.

Figure 10:
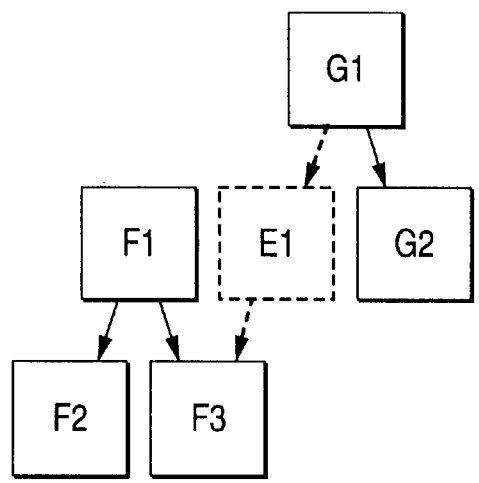
FIG. 10 is an illustration to show version group separation when version information or a file is deleted.

FIG. 10 is an illustration to show version group separation when version information or a file is deleted.

Although files E1, F1, F2, F3, G1, and G2 belonged to the same version group at the beginning, the files F1, F2, and F3 and the files G1 and G2 become separate version groups having no version relationship with each other by deleting the version information of the file E1 without relinking. Thus, version groups can also be separated by deleting a file or its version information.

Figure 11:
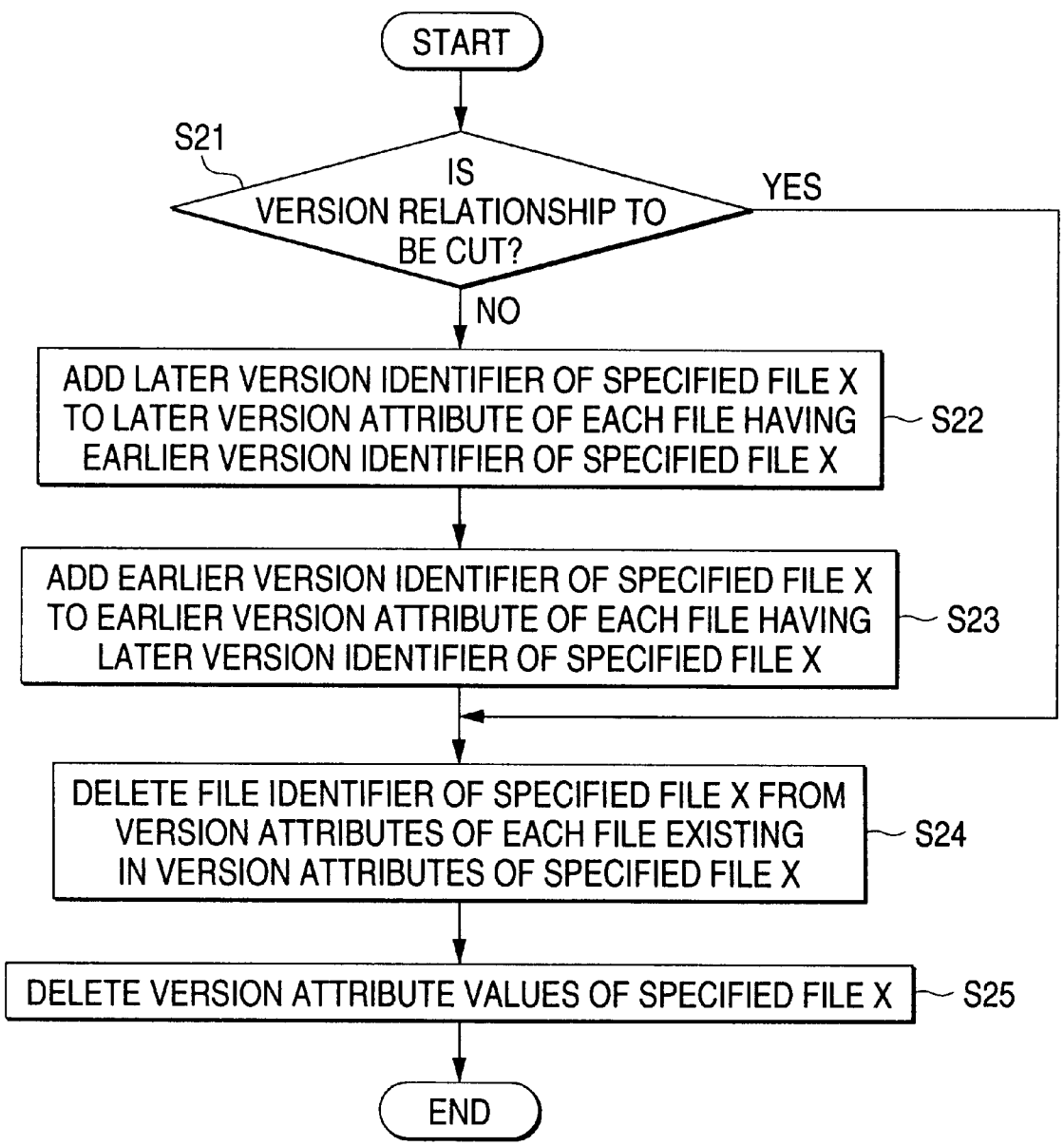
FIG. 11 is a flowchart to show a flow of a version information deletion process.

FIG. 11 is a flowchart to show a flow of a version information deletion process.

First, in version information deletion or version information deletion associated with file deletion, whether or not the version relationship is to be cut is determined at step S21. Not to cut the earlier and later version relationships, identifiers set in the later version file identifier information in the version information of specified file X are added to the later version file identifier information (later version attribute) in the version information of each of files having identifiers set in the earlier version file identifier information (earlier version attribute) in the version information of specified file X at step S22. Subsequently, identifiers set in the earlier version file identifier information (earlier version attribute) in the version information of specified file X are added to the earlier version file identifier information in the version information of each of files having identifiers set in the later version file identifier information (later version attribute) in the version information of specified file X at step S23.

Next, from the later version file identifier information (later version attribute) in the version information of each of files having identifiers set in the earlier version file identifier information (earlier version attribute) in the version information of specified file X and the earlier version file identifier information (earlier version attribute) in the version information of each of files having identifiers set in the later version file identifier information (later version attribute) in the version information of specified file X, the identifier of the specified file X set therein is deleted at step S24. Relinking the version relationships is now complete. The values set in the earlier version file identifier information and later version file identifier information (version attributes) in the version information of specified file X are deleted at step S25.

On the other hand, if it is determined at step S21 that the version relationship may be cut when version information is deleted, control goes to step S24 at which the file identifier of the specified file X is deleted from the information concerning the files having the version relationship with the specified file X. Then, the version attribute values of the specified file X are deleted at step S25.

Next, an example of using version information stored in the version information storage section 30 in the version information file form to get necessary file information by the version group information getting section 20 will be discussed.

To get version relationship files in the same version group, only necessary files can be gotten by specifying version relationship from one specified file. Here, to easily understand version relationships, earlier versions are called parent versions, later versions called child versions, later versions of child versions called grandchild versions, . . . to represent version relationships in family relation, whereby only necessary files can be easily gotten by diversified version relationship file getting methods from files having complicated version relationships with each other.

Figure 12:
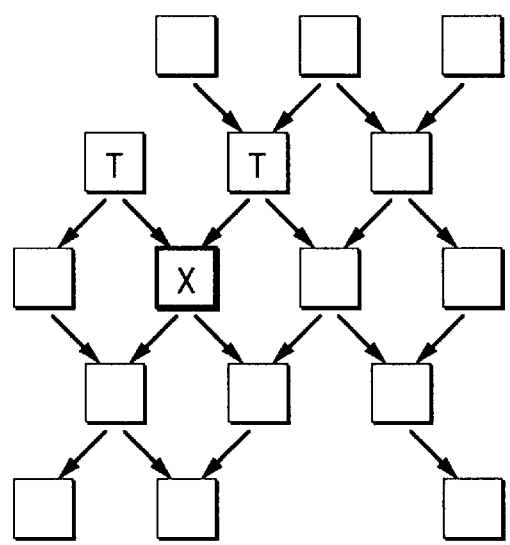
FIG. 12 is an illustration to show file relationships concerning getting of parent version files.

Version relationship file getting methods will be discussed below:

FIG. 12 is an illustration to show file relationships concerning getting of parent version files.

In the figure, square boxes denote files, file X represented by a heavy square denotes file X specified to find parent version files, arrows concatenating the files denote version relationships, and files indicated by T denote files gotten by getting parent version files.

That is, to specify file X and get parent version files of the file X, the earlier version file identifier information in the version information of the specified file X can be referenced for getting the parent version files.

Figure 13:
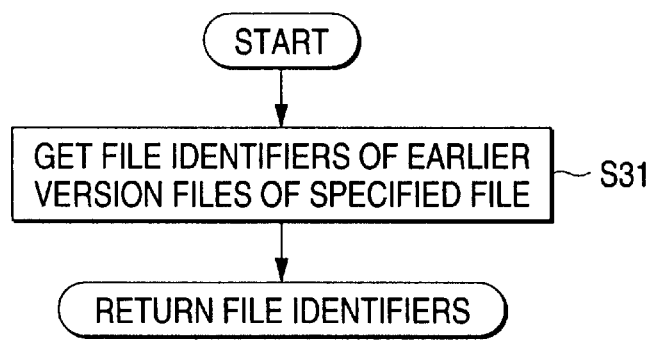
FIG. 13 is a flowchart to show a flow of a process of getting parent version files.

FIG. 13 is a flowchart to show a flow of a process of getting parent version files.

According to the flowchart, first the version attribute in the version information of the specified file is gotten. Here, the parent version files are gotten. Then, the file identifiers set in the earlier version file identifier information in the version information are gotten at step S31. The gotten file identifiers are returned to the process requesting client. The parent version file getting process is now complete.

Figure 14:
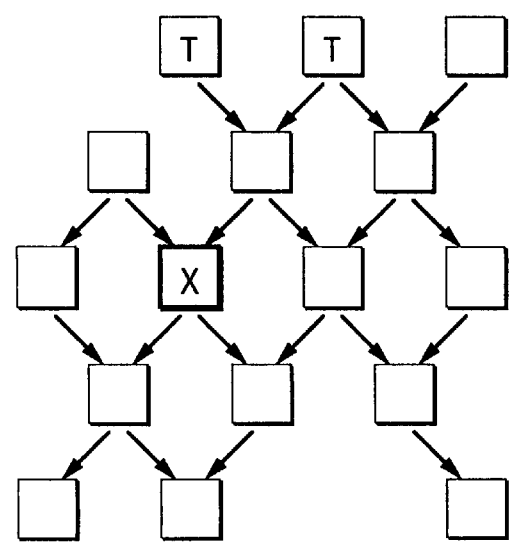
FIG. 14 is an illustration to show file relationships concerning getting of ancestor version files of x generations earlier from a specified file.

FIG. 14 is an illustration to show file relationships concerning getting of ancestor version files of x generations earlier from a specified file.

An example of getting of ancestor version files of x generations earlier from specified file X will be discussed. Here, for example, if x is two, grandparent version files are gotten; parent version files T of the parent version file of the specified file X are to be gotten as in the example shown in FIG. 14.

Figure 15:
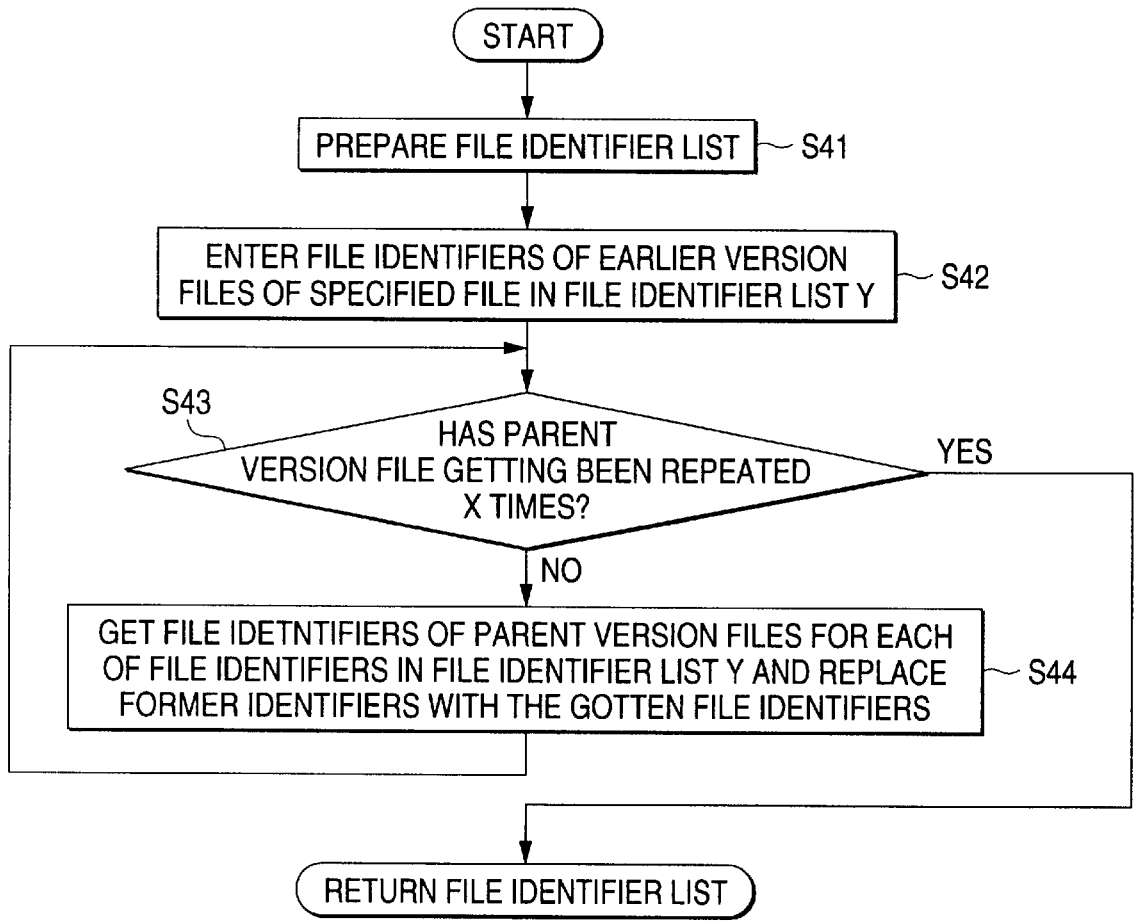
FIG. 15 is a flowchart to show a flow of a process of getting ancestor version files.

FIG. 15 is a flowchart to show a flow of a process of getting ancestor version files.

To get ancestor version files of x generations earlier from a specified file, first a null file identifier list Y is prepared at step S41. The version attribute in the version information of the specified file is entered in the file identifier list Y. Here, ancestor version files are gotten. Then, the file identifiers set in the earlier version file identifier information in the version information are entered in the file identifier list Y at step S42. Next, whether or not parent version file getting has been repeated as many times as the specified x generations (x) is determined at step S43. If parent version file getting has not been repeated x times, the file identifiers of parent version files are gotten for each of the file identifiers entered in the file identifier list Y and the former identifiers are replaced with the gotten file identifiers at step S44.

The process of getting the file identifiers of the parent version files and replacing the former identifiers with the file identifiers of the parent version files is repeated x times, whereby the file identifiers of the ancestor version files of x generations earlier from the specified file are entered in the file identifier list Y. When it is determined at step S43 that parent version file getting has been repeated the specified number of times, the file identifier list Y containing the file identifiers of the files to be gotten is returned to the process requesting client.

Figure 16:
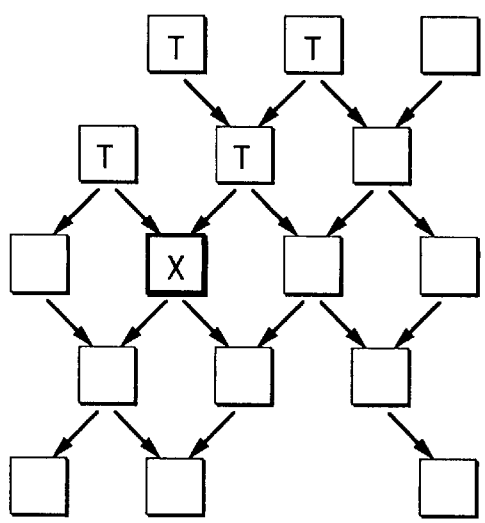
FIG. 16 is an illustration to show file relationships concerning getting of all ancestor version files.

FIG. 16 is an illustration to show file relationships concerning getting of all ancestor version files.

To get all files of direct ancestors of a specified file, when the parents, grandparents, . . . are traced back to from the specified file X and the files having no parent version files are reached, all files T are to be gotten.

Figure 17:
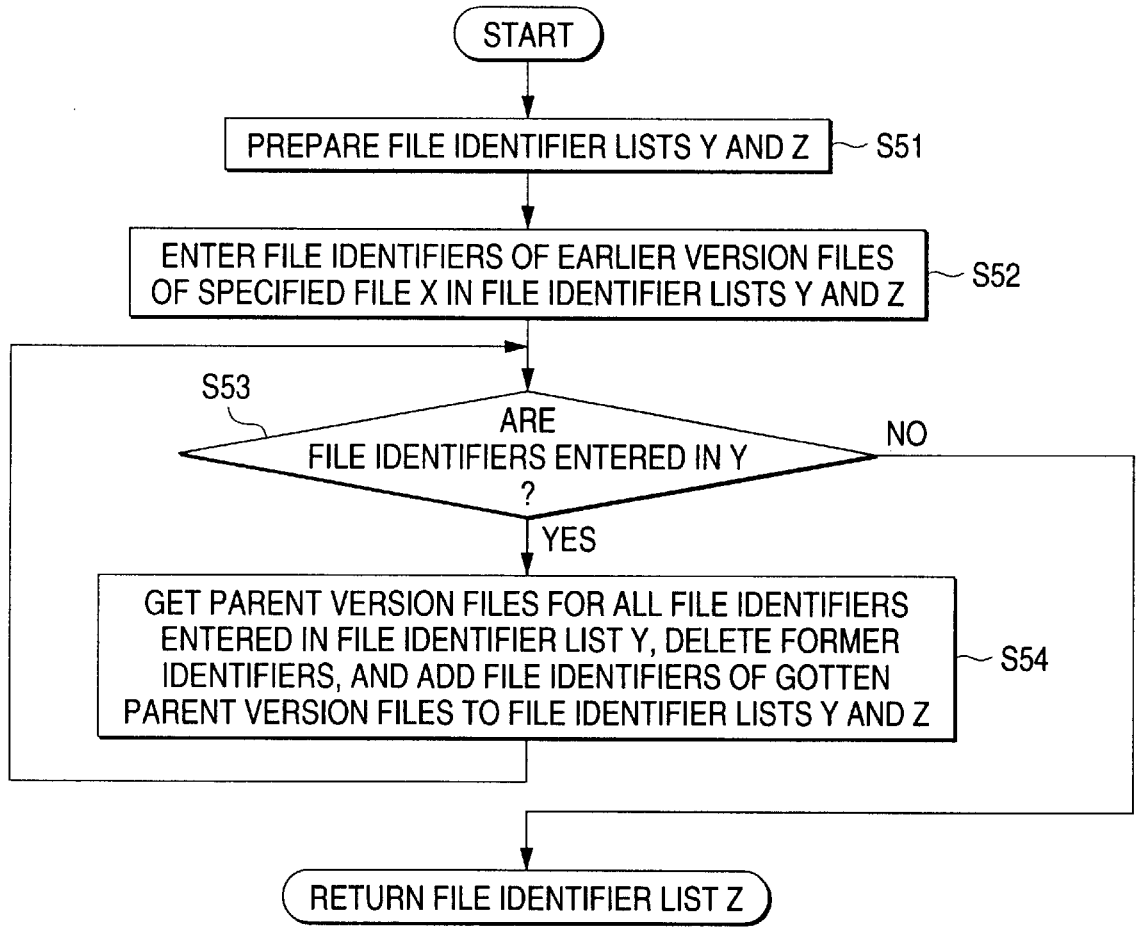
FIG. 17 is a flowchart to show a flow of a process of getting all ancestor version files.

FIG. 17 is a flowchart to show a flow of a process of getting all ancestor version files.

To get all ancestor version files, first null file identifier lists Y and Z are prepared at step S51. The version attribute in the version information of the specified file is entered in the file identifier lists Y and Z. Here, all ancestor version files are gotten. Then, the file identifiers set in the earlier version file identifier information in the version information are entered in the file identifier lists Y and Z at step S52. Next, whether or not file identifiers remain in the file identifier list Y is determined at step S53. If file identifiers remain, the earlier version files are gotten for each of the remaining file identifiers, the former file identifiers are deleted, and the file identifiers of the earlier version files gotten this time are added to the file identifier lists Y and Z at step S54. Here, if the earlier version files to be gotten do not exist, the former file identifiers are only erased from the file identifier list Y.

Therefore, when earlier version file getting is repeated for all file identifiers entered in the file identifier list Y and files having no earlier version files, namely, root version files are reached, the file identifier list Y becomes empty of file identifiers. It is determined at step S53 that the file identifier list Y becomes empty, the file identifier list Z containing the file identifiers of the files gotten in the process is returned to the process requesting client, which then gets the file identifiers of all files of direct ancestors from the specified file.

Figure 18:
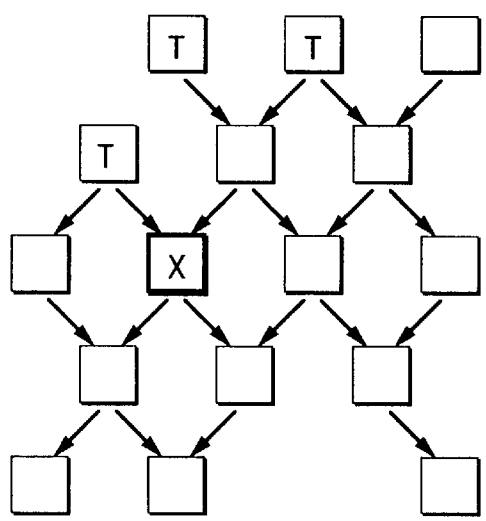
FIG. 18 is an illustration to show file relationships concerning getting of root version files of direct ancestors from a specified file.

FIG. 18 is an illustration to show file relationships concerning getting of root version files of direct ancestors from a specified file.

To get the root version files of the specified file, the files having no parent version files in the direct ancestor files of the specified file are to be gotten. In the example shown in FIG. 18, the root version files of a specified file X are three files T.

Figure 19:
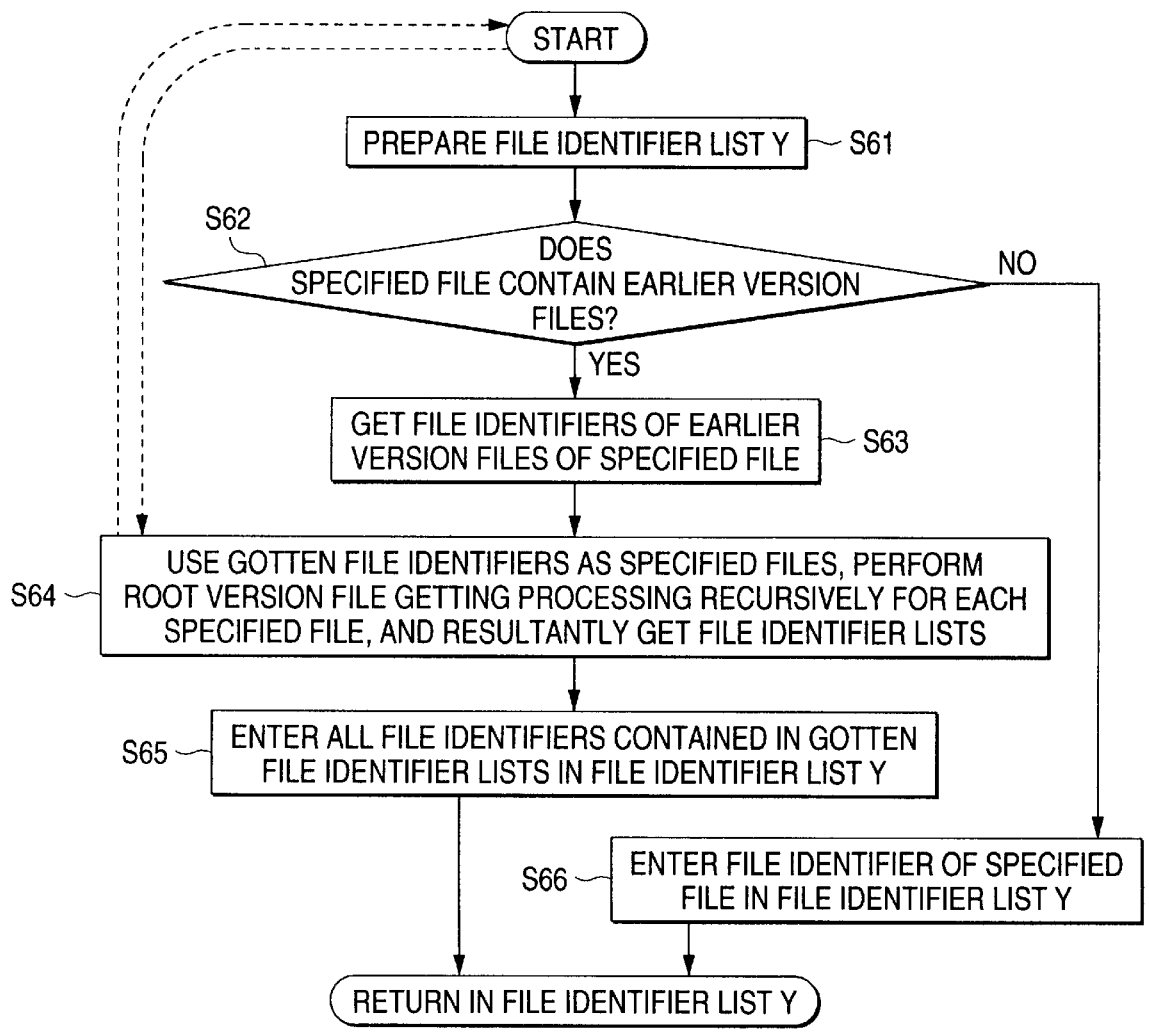
FIG. 19 is a flowchart to show a flow of a process of getting root version files of direct ancestors.

FIG. 19 is a flowchart to show a flow of a process of getting root version files of direct ancestors.

To get root version files, first a null file identifier list Y is prepared at step S61. Next, whether or not the specified file contains earlier version files is determined at step S62. If earlier version files exist, the file identifiers of the earlier version files are gotten from the earlier version file identifier information in the version information of the specified file at step S63. The gotten file identifiers are used as specified files, root version file getting processing is performed recursively for each specified file, and resultantly file identifier lists are gotten at step S64. All file identifiers entered in the gotten file identifier lists are entered in the file identifier list Y at step S65. At this time, duplicate file identifiers are not entered in the file identifier list Y. If the specified file does not contain any earlier version file at step S62, the file identifier of the specified file is entered in the file identifier list Y at step S66. When all root version files of direct ancestors are thus gotten, the file identifier list Y is returned to the process requesting client.

Figure 20:
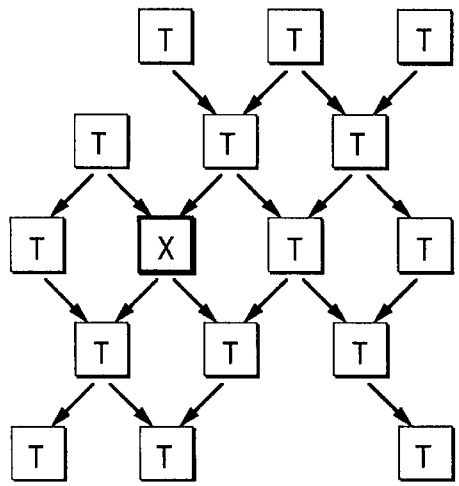
FIG. 20 is an illustration to show file relationships concerning getting of all files having version relationships with a specified file.

FIG. 20 is an illustration to show file relationships concerning getting of all files having version relationships with a specified file.

To get all files having some version relationship with a specified file, all files in the version group containing the specified file are to be gotten. In the example shown in FIG. 20, all files T including the specified file X are files to be gotten.

Figure 21:
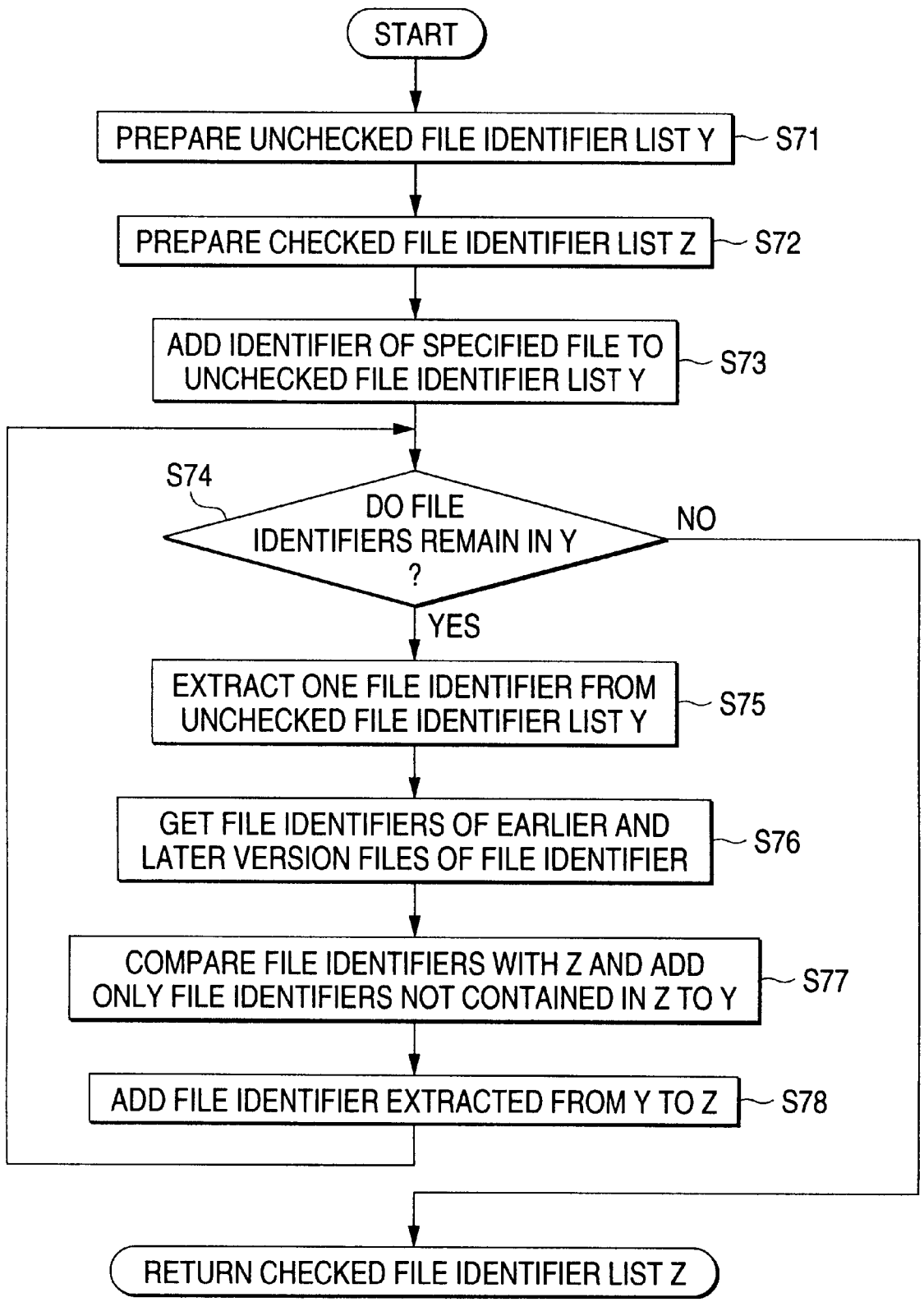
FIG. 21 is a flowchart to show a flow of a process of getting all files having version relationships with a specified file.

FIG. 21 is a flowchart to show a flow of a process of getting all files having version relationships with a specified file.

To get all files having version relationships with a specified file, first a null file identifier list Y for entering unchecked file identifiers is prepared at step S71, and a null file identifier list Z for entering checked file identifiers is prepared at step S72. Next, the identifier of the specified file is added to the unchecked file identifier list Y at step S73. Whether or not file identifiers remain in the unchecked file identifier list Y is determined at step S74. If file identifiers remain in the unchecked file identifier list Y, one file identifier is extracted from the unchecked file identifier list Y at step S75, and the file identifiers of the earlier and later versions of the extracted file identifier are gotten at step S76. The gotten file identifiers are compared with the contents of the checked file identifier list Z and only file identifiers not contained in the checked file identifier list Z are added to the unchecked file identifier list Y at step S77. That is, whether or not the gotten earlier and later version files are already checked are determined and unchecked files in the earlier and later version files are added to the unchecked file identifier list Y. The file identifier extracted from the unchecked file identifier list Y at step S75 is added to the checked file identifier list Z at step S78. After this, control returns to step S74 and steps S74–S78 are repeated until no file identifiers remain in the unchecked file identifier list Y. If it is determined at step S74 that no file identifiers remain in the unchecked file identifier list Y, the file identifiers of all files having version relationships with the specified file are entered in the checked file identifier list Z, which finally is returned to the process requesting client.

In getting the files having version relationships with the specified file shown in FIGS. 12, 14, 16, and 18, the version relationships are traced to the ancestors from the specified file; likewise, they can also be traced to descendants.

That is, the child version files of a specified file can be gotten by once tracing the later version identifier information of the specified file, and if the later version identifier information is traced x times, descendant version files of x generations later can be gotten. For example, if z=2, grandchild version files are gotten.

The files of all versions of direct descendants of a specified file (children, grandchildren, . . . ) can be gotten by getting files in the opposite direction to that in FIG. 16. The files of leaf (termination) versions having no child versions in direct descendant files of a specified file, namely, the most recent files derived from the specified file can be gotten by getting files in the opposite direction to that in FIG. 18.

Further, files having different version relationship can also be gotten by combining the above-described version relationships. For example, to get brother version files of a specified file, first the parent version files of the specified file (first step getting result) are gotten, and subsequently the child version files of the files (second step getting result of files having version relationship) are gotten, whereby the brother version files of the specified file are gotten.

Getting parent files and getting descendant files can be combined to get all descendant version files of parent files can be gotten and getting all files having version relationships with a specified file and getting root versions of direct ancestors can be combined to get the root versions of all files having version relationships with the specified file. Thus, the version files having special relationship with the specified file can be flexibly gotten as required.

In addition, for example, a method of getting earlier and later version files of a specified file, a method of getting files which are not root version files in all files having version relationships with a specified file, or the like may be required. Thus, file getting methods based on algorithms are offered as a function of the file management system in the server, whereby various version management methods are provided.

Figure 22:
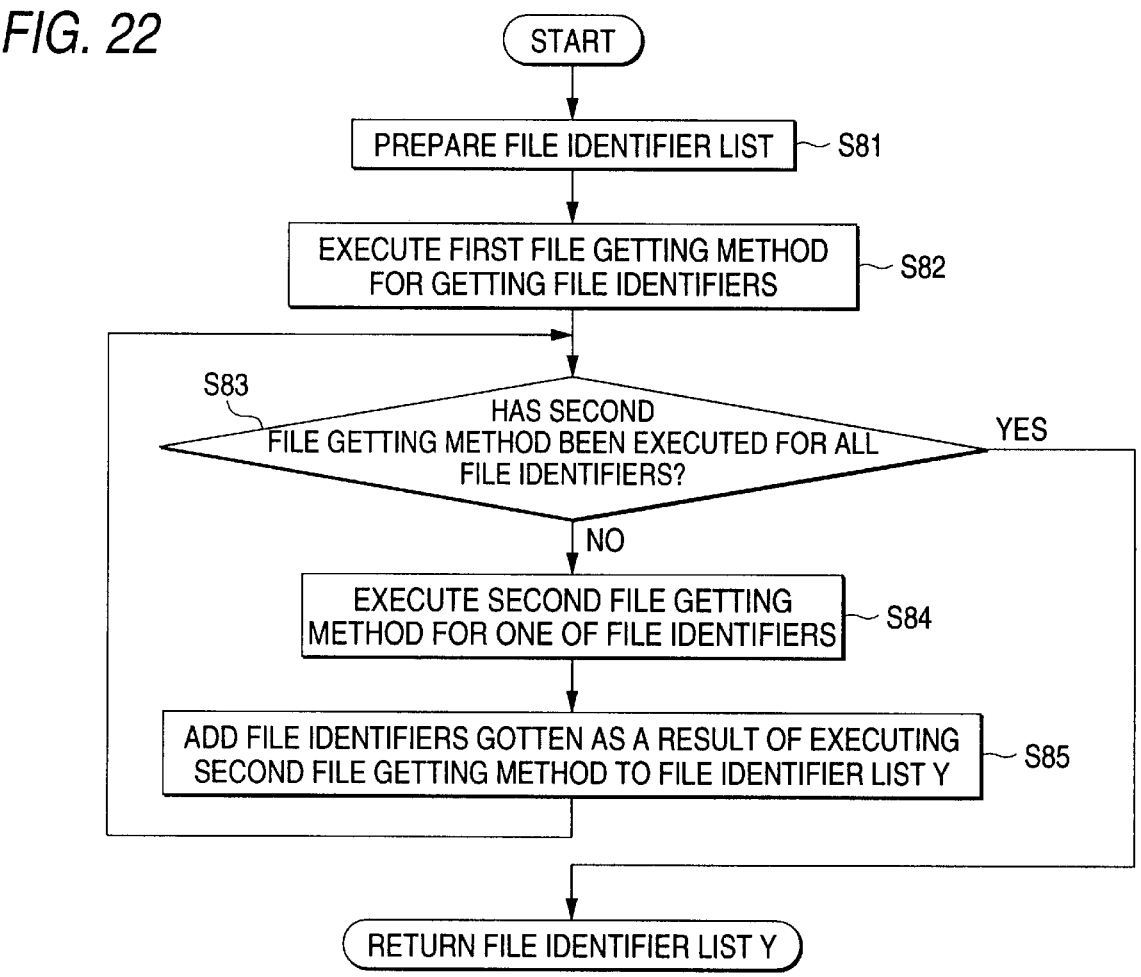
FIG. 22 is a flowchart to show a flow of a process of getting files having specific version relationship by using file getting methods in combination.

FIG. 22 is a flowchart to show a flow of a process of getting files having specific version relationship by using file getting methods in combination.

First, a null file identifier list Y is prepared at step S81 and a first file getting method is executed for getting file identifiers at step S82. Any of the five methods in FIGS. 12, 14, 16, 18, and 20 provided in the description given above and the four getting methods of files having version relationships in the descendant direction from a specified file can be applied as the first file getting method. Next, whether or not a second file getting method has been executed for all gotten file identifiers is determined at step S83. If there are file identifiers for which the second file getting method is not executed at step S83, the second file getting method is executed for one of the file identifiers at step S84 and the file identifiers gotten as a result of executing the second file getting method are added to the file identifier list Y at step S85. Any of the nine methods described above can also be applied to the second file getting method. The second file getting method is executed for all file identifiers gotten at step S82 by performing the loop process of steps S83–S85, and the finally obtained file identifier list Y is returned to the process requesting client.

Necessary files having specific version relationship can be gotten more flexibly by properly combining the first and second file getting methods or combining three or more file getting methods.

Figure 23:
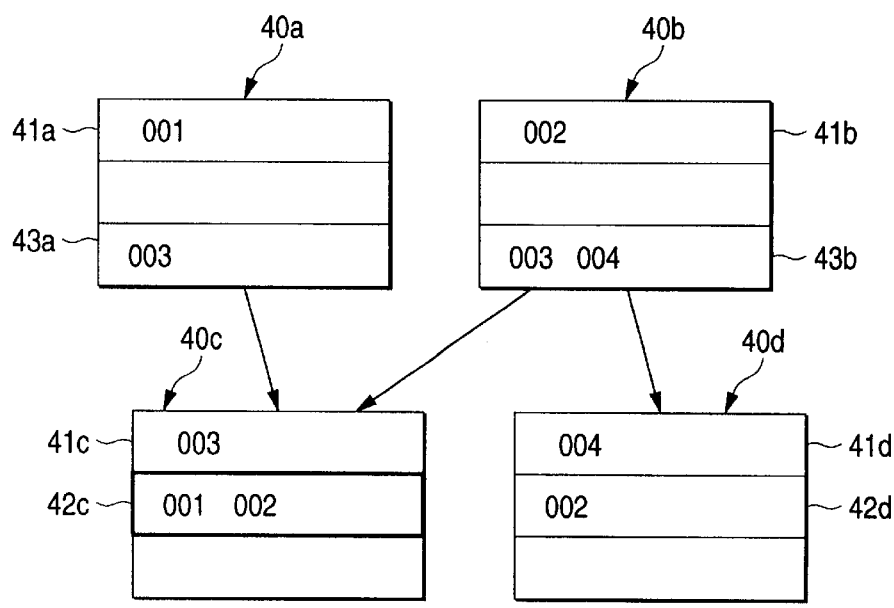
FIG. 23 is an illustration to show an example of the contents of version information when files are gotten by executing file getting methods in combination.
Figure 24:
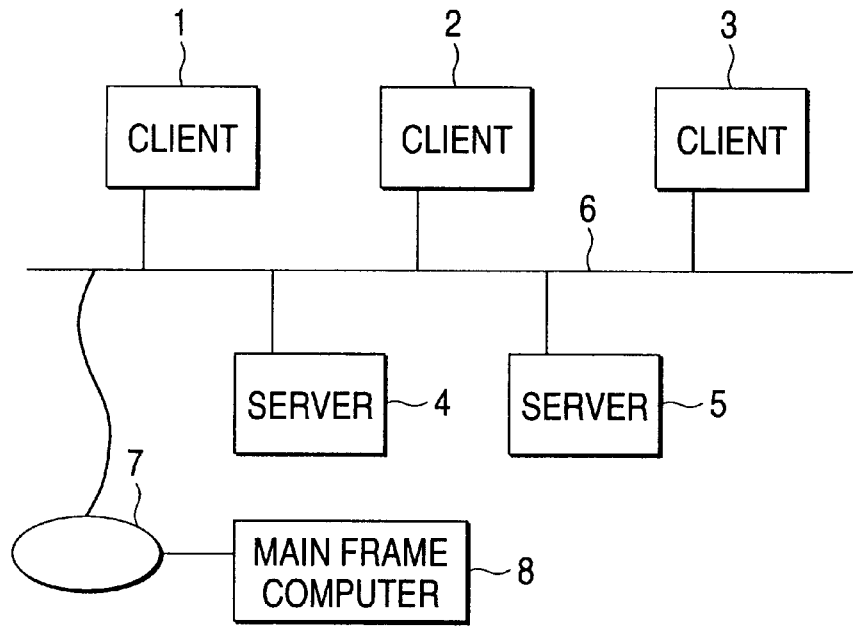
FIG. 24 is a schematic block diagram of a client-server system.
Figure 25:
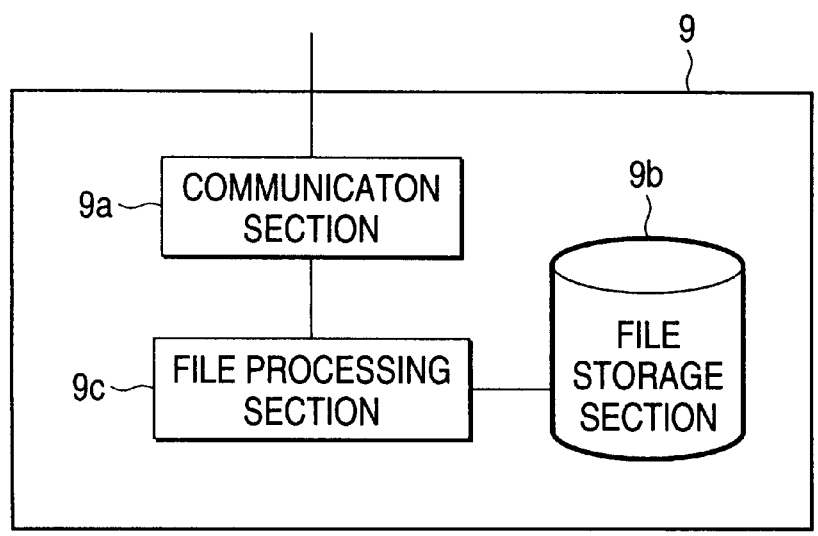
FIG. 25 is a block diagram to show a configuration example of a server.

FIG. 23 is an illustration to show an example of the contents of version information when files are gotten by executing file getting methods in combination.

In the example, getting of files having brother version relationships with a specified file will be discussed. Getting the brother version files consists of two steps of getting parent version files of the specified file and subsequently getting child version files of the gotten parent version files.

In the example shown in FIG. 23, four version information pieces 40a, 40b, 40c, and 40d corresponding to four files are indicated. File identifier information pieces 41a, 41b, 41c, and 41d of the version information 40a, 40b, 40c, and 40d are file identifiers 001, 002, 003, and 004. File identifier 003 of the file having version relationship with the file 001 is set in later version file identifier information 43a of the version information 40a, file identifiers 003 and 004 are set in later version file identifier information 43b of the version information 40b, file identifiers 001 and 002 are set in earlier version file identifier information 42c of the version information 40c, and file identifier 002 is set in earlier version file identifier information 42d of the version information 40d. Here, assume that the file having the file identifier 003 is the specified file.

First, the file identifiers 001 and 002 of the parent version files of the specified file are gotten from the earlier version identifier information 42c of the specified file. Subsequently, the file identifier 003 of the child version file of the file having the file identifier 001 is gotten from the later version identifier information 43a of the file having the file identifier 001, and the file identifiers 003 and 004 of the child version files of the file having the file identifier 002 are gotten from the later version identifier information 43b of the file having the file identifier 002. Resultantly, the two file identifiers 003 and 004 are returned. The duplicated file identifiers 003 and 003 are assumed to be one file identifier, and the file identifiers of the brother version files of the specified file become 003 and 004.

As described above, the file management system of the invention comprises the file link control means for relating earlier and later version files to files and the version group information getting means for getting a version group consisting of files having specific relationship with a specified file based on relation information.

Thus, the information required for relating files to each other by the file link control means is only earlier and later versions, so that the version information amount can be lessened and costs of version management affected by change of version relationships such as linking or separation of version groups and filing operation such as addition or deletion of files to or from version relationships can be reduced.

Since the version information is simple, diversified version management can be provided and files updated in a complicated process can also be saved containing the complicated process. Moreover, while integrity of version relationships is maintained, files having any version relationships can also be gotten, changed, added, or deleted, and further version groups can also be linked or separated.

Only necessary files can be gotten by various version relationship specification methods of files in complicated version relationships, and further filing operation can be performed for the gotten files, whereby complicated version relationships can be easily managed while they are maintained.

To actually prepare a document and then frequently update and correct the document, often simple sequential version management cannot handle it. Such a document managed in complicated version relationships requires methods of getting documents having various version relationships with the document depending on the situation at the time such that not only the immediately earlier version of the document, but also the still earlier version of the document is referenced, that not only the latest version document, but also old version document is corrected, or that when more than one person corrects a document at the same time, other brother versions being corrected are referenced. To handle such documents having complicated version relationships, the client must make much endeavor to understand the complicated relationships by tracing the version relationships and obtain appropriate information (get documents having version relationships). However, the server is provided with complicated version relationship management and an information getting section using version relationships, whereby the client needs only give simple instructions to the server, which then can process complicated version relationships by various version management functions and return necessary information to the client. This means that the server can provide version management methods for the client as functions and that the client can use the functions for easy file handling using the version relationships. Further, the server is provided with the version management and getting functions, whereby communication costs between the clients and servers in the client and server system can be lessened.

What is claimed is:

1. A file management system for managing files stored in a file storage, comprising:

file link control means for giving file identifiers of an earlier version file of each file and a later version file of each file to each file as a file version attribute; and file information getting means, being responsive to a request for getting a version group having a specific version relationship with a specified file, for tracing the version attributes of the specified file and getting information of files belonging to said version group.

2. The file management system as claimed in claim 1, wherein said file link control means comprises version relationship link means for linking files when a file is registered or changed by adding file identifiers of earlier or later version files to the version attributes of said registered or changed file and files having a version relationship with said registered or changed file; and version relationship separation means, when a file or the version attribute of the file is deleted, for deleting the version attributes of files having a version relationship with said deleted file.

3. The file management system as claimed in claim 2, wherein said version relationship link means, when a file is deleted by an operation instruction, separates the version information of the earlier and later files having a version relationship with said deleted file.

4. The file management system as claimed in claim 2, wherein said file link control means includes version relationship mismatch determination means for determining whether or not a version relationship loop is made when setting or adding a version relationship among the files.

5. The file management system as claimed in claim 4, wherein said file link control means includes version relationship relinking means, when a file or a version attribute of the file is deleted, for relinking version relationships for files having a direct version relationship with said deleted file to maintain a version relationship between the files having a direct version relationship with said deleted file.

6. A file management method for managing files stored in a file storage, comprising the steps of:

giving file identifiers of an earlier version file of each file and a later version file of each file as a version attribute of each file, thereby assigning version relationships among the files to the flies; and when getting files in a version group having a specific version relationship, tracing the file identifiers of the earlier or later version files from the version attribute of a specified file as a start point and collecting the files having the specific version relationship with said specified file.

7. The file management method as claimed in claim 6, further comprising the steps of adding, when a file is registered or changed, file identifiers of earlier or later version files to the version attributes of said registered or changed file and files having a version relationship with said registered or changed file to link the files; and deleting, when a file or the version attribute of the file is deleted, the version attributes of files having a version relationship with said deleted file.

8. The file management method as claimed in claim 7, further comprising the steps of determining whether or not a version relationship loop is made when setting or adding a version relationship among files; and setting or adding the version relationship among the files when the version relationship loop is not made.

* * * * *

UNITED STATES PATENT AND TRADEMARK OFFICE
CERTIFICATE OF CORRECTION

PATENT NO.: 5,983,241
DATED: November 9, 1999
INVENTOR: Haruhisa HOSHINO

It is certified that an error appears in the above-identified patent and that said Letters Patent is hereby corrected as shown below:

Claim 6, Column 16, line 11, "flies" should read --files--.

Signed and Sealed this

Fifth Day of September, 2000

Attest:

Q. TODD DICKINSON

Attesting Officer

Director of Patents and Trademarks